UNITED STATES PATENT OFFICE.

JOHN THOMAS O'CALLAGHAN, OF LONDON, ENGLAND.

MANUFACTURE OF GERM-FLOUR.

SPECIFICATION forming part of Letters Patent No. 589,978, dated September 14, 1897.

Application filed June 25, 1896. Serial No. 596,920. (No specimens.) Patented in England September 8, 1894, No. 17,086.

*To all whom it may concern:*

Be it known that I, JOHN THOMAS O'CALLAGHAN, a subject of the Queen of Great Britain, residing at London, in the county of Middlesex, England, have invented certain new and useful Improvements in the Manufacture of Germ Flour or Meal Used in the Preparation of Bread, Biscuits, Pastry, and the Like, (for which I have received Letters Patent in England, No. 17,086, dated September 8, 1894;) and I do hereby declare that the following is a full, clear, and exact description of the invention, which will enable others skilled in the art to which it appertains to make and use the same.

My invention relates to the preparation of what is known as "germ" flour or meal used for the manufacture of bread, biscuits, pastry, and the like, by means of which the said bread, biscuits, pastry, and the like are rendered easily digestible and highly nourishing.

My invention is particularly applicable to what I may term "white germ flour or meal," and in making said product I proceed in the following manner: I take, for example, fifty-six pounds of the raw germ of wheat and put it in a large vessel—such, for example, as a tub or pan—and over it I pour twelve gallons of water previously heated to a temperature of, say, 170° Fahrenheit. This I cover over closely with sacking, blanketing, or the like, for the purpose of retaining the heat, and allow the mixture to stand for about three hours, during which period it is occasionally stirred. At the end of the said period of three hours I filter or strain the mixture through a jelly-bag, after which I evaporate it down to a weight of ten pounds in a steam-heated pan or other convenient vessel. I now obtain what I may term "a liquid extract of wheaten germ." I now add to this quantity of liquid extract of wheaten germ two pounds of the concentrated extract of barley-malt and three pints of lime-water. I now take a sack—that is to say, two hundred and eighty pounds—of flour or fine wheaten meal, and out of this I take such an amount as will suffice to make dough with the said mixture of liquid extract of wheaten germ, of malt extract, and of lime-water. This dough I roll out into thin sheets, which are allowed to dry, preferably at a temperature of 140° Fahrenheit, after which these dried sheets are ground to a fine powder. This powder I then mix with the remainder of the two hundred and eighty pounds or sack of flour or fine wheaten meal, and I thus obtain a sack of white germ flour or meal.

In the process herein specified I have set forth certain relative proportions and certain temperatures. I desire it to be understood that I do not limit myself to any particular proportion or temperature, as these may be departed from a considerable extent without seriously injuring the product obtained. I have, however, found by experiment that the said temperatures and relative proportions give good results in practice, and I advise that they be adhered to, or at any rate not departed from to an extent exceeding, say, ten per cent. I would particularly advise that the proportion of lime-water, which is used for the purpose of neutralizing the bitter principle of the germ, should not be exceeded, as in that case there would be a liability of subsequent fermentation being checked.

Having thus described my invention, what I claim, and desire to secure by Letters Patent, is—

1. The herein-described process of making germ flour or meal, which consists in steeping germ of wheat in hot water and protecting the same from evaporation or heat radiation for about three hours meanwhile stirring it at intervals, filtering or straining said mixture and evaporating it and adding thereto a solution of concentrated extract of barley-malt and lime-water, then preparing from the mixture thus obtained a dough and finally drying said dough and grinding it to a powder and mixing it with plain flour or fine wheaten meal.

2. The herein-described process of making germ-flour which consists in pouring over the germ of wheat a quantity of water at a temperature of from about 153° to 187° Fahrenheit, protecting the mixture from evaporation or heat radiation for about three hours and meanwhile stirring the same at intervals, filtering or straining the said mixture and evaporating it to about twenty per cent. of its original weight, and then adding thereto a solution of concentrated extract of barley-malt and lime-water, and in preparing a dough from the product thus obtained drying it and grinding the same to a powder and mixing it with plain flour or fine wheaten meal.

In testimony whereof I have hereunto set my hand, this 23d day of March, 1896, in the presence of the two subscribing witnesses.

JOHN THOMAS O'CALLAGHAN.

Witnesses:
DAVID VINER,
HENRY GAUL.